(12) United States Patent
Chen et al.

(10) Patent No.: US 11,016,771 B2
(45) Date of Patent: May 25, 2021

(54) PROCESSOR AND INSTRUCTION OPERATION METHOD

(71) Applicant: Chengdu Haiguang Integrated Circuit Design Co., Ltd., Sichuan Province (CN)

(72) Inventors: Lei Chen, Austin, TX (US); Zehan Cui, Chengdu (CN)

(73) Assignee: Chengdu Haiguang Integrated Circuit Design Co., Ltd., Sichuan (CN)

(*) Notice: Subject to any disclaimer, the term of this patent is extended or adjusted under 35 U.S.C. 154(b) by 0 days.

(21) Appl. No.: 16/419,121

(22) Filed: May 22, 2019

(65) Prior Publication Data

US 2020/0371807 A1 Nov. 26, 2020

(51) Int. Cl.
*G06F 9/38* (2018.01)
*G06F 9/50* (2006.01)

(52) U.S. Cl.
CPC .......... *G06F 9/3802* (2013.01); *G06F 9/3818* (2013.01); *G06F 9/3867* (2013.01); *G06F 9/50* (2013.01)

(58) Field of Classification Search
None
See application file for complete search history.

(56) References Cited

U.S. PATENT DOCUMENTS

2009/0150890 A1* 6/2009 Yourst ................... G06F 9/3009
718/102
2018/0232235 A1* 8/2018 Gaur ..................... G06F 9/3838

* cited by examiner

*Primary Examiner* — John M Lindlof
(74) *Attorney, Agent, or Firm* — Barnes & Thornburg LLP; G. Peter Nichols

(57) ABSTRACT

Disclosed in embodiments of the present disclosure are a processor and an instruction operation method. The method includes obtaining criticality information of an instruction, wherein the criticality information of the instruction indicates importance degree of the instructions in a running process of a program; determining an operation sequence of the instruction based on the criticality information; and performing operations for the instruction based on the determined operation sequence of the instruction.

18 Claims, 4 Drawing Sheets

PROCESSOR AND INSTRUCTION OPERATION METHOD

TECHNICAL FIELD

The present disclosure relates to an electronic field, in particular to a processor and an instruction operation method.

BACKGROUND

In a processor, instructions can be executed pipelined. Herein, the processor can comprise a plurality of execution units, and the instructions can be executed out of order so as to realize improvement of efficiency. Such processor may be for example a superscalar pipelined microprocessor. In addition, before execution, the instructions to be executed or data needed for executing the instruction can be prefetched by a prefetch unit, i.e., prefetching the instructions or data to a cache having a higher reading speed, so as to increase the speed of the execution unit when the instructions are executed.

The program running efficiency of the existing processors needs to be further optimized.

SUMMARY

According to one aspect of the present disclosure, there is provided an instruction operation method, comprising: obtaining criticality information of an instruction, the criticality information of the instruction indicating importance degree of the instruction in a running process of a program; determining an operation sequence of the instruction based on the criticality information; and performing an operation for the instruction based on the determined operation sequence of the instruction.

In some embodiments, the operation performed for the instruction comprises at least one of a fetch operation, a decoding operation, an execution operation and a prefetch operation.

In some embodiments, the instruction is an instruction from an instruction set, and the criticality information is obtained from an instruction cache.

In some embodiments, the instruction is a microinstruction, and the criticality information is obtained from a microinstruction cache.

In some embodiments, obtaining criticality information of the instruction comprises: determining a storage location of the criticality information according to a storage location of the instruction, to obtain the criticality information.

In some embodiments, obtaining criticality information of an instruction comprises: obtaining corresponding criticality information of the instruction according to an instruction index and an association relationship between the instruction index and the criticality information.

In some embodiments, the criticality information is determined according to at least one of the following items: dependency relationship information between the instruction and other instructions, pipeline execution information of the instruction, and hit information during execution of the instruction.

In some embodiments, the program is adapted for being run on a same processor for many times, and determining the criticality information comprises: updating the criticality information according to information about a preceding run of the program.

According to another aspect of the present disclosure, there is further provided a processor, configured to perform the instruction operation method as described above.

In some embodiments, the processor comprises: a fetch unit, configured to perform a fetch operation; a decoding unit, configured to perform a decoding operation for the instruction; an execution unit, configured to execute the instruction; and a prefetch unit, configured to perform a prefetch operation for the instruction.

In some embodiments, the instruction is an instruction from an instruction set.

In some embodiments, the processor further comprises an instruction cache, configure to store criticality information of the instruction.

In some embodiments, the criticality information is obtained by way of: determining a storage location of the criticality information according to a storage location of the instruction, to obtain the criticality information.

In some embodiments, the instruction is a microinstruction obtained by decoding the instruction from the instruction set.

In some embodiment, the criticality information is obtained by way of: obtaining corresponding criticality information of the instruction according to an instruction index and an association relationship between the instruction index and the criticality information.

In some embodiments, the processor further comprises a criticality information determination unit, configured to determine the criticality information based on at least one of following items: dependency relationship information between the instruction and other instructions, pipeline execution information of the instruction, and hit information during execution of the instruction.

In some embodiments, the program is adapted for being run on the processor for many times, and the processor further comprises a criticality information determination unit, which is adapted for updating the criticality information according to information about a preceding run of the program According to another aspect of the present disclosure, there is further provided an electronic device, comprising the processor as described above and a processor readable storage medium stored thereon instructions used for realizing functions of a program, and the functions of the program is realized by execution of the instructions by the processor.

Compared with the prior art, technical solutions provided by some embodiments of the present disclosure have at least following beneficial effects.

The operation sequence of the instructions can be determined by utilizing the criticality information of the instruction. Since the criticality information indicates importance degree of the instructions in the running process, the operation sequence (for example, at least one of fetch sequence, decode sequence, execution sequence and prefetch sequence of the instruction) of the instructions in the instruction pipeline can be determined based on the criticality information, which can make the operation sequence of the instructions more reasonable, so as to enhance running efficiency of the program.

BRIEF DESCRIPTION OF THE DRAWINGS

In order to describe technical solutions of embodiments of the present disclosure more clearly, accompanying figures needed to be used in description of embodiments will be introduced below briefly. Obviously, the following figures as described are just some embodiments of the present disclosure. For those ordinary skilled in the art, other figures can also be obtained according to these figures without paying any inventive labor. The following figures are not purposely drawn by scaling in proportion according to the actual dimensions, because the key point is to show the substance and spirit of the present disclosure.

DETAILED DESCRIPTION

In order to make purposes, technical solutions and advantages of embodiments of the present disclosure more clearly, technical solutions in embodiments of the present disclosure will be described clearly and completely by combining with accompanying figures in the embodiments of the present disclosure. Obviously, the embodiments described below are just a part of embodiments of the present disclosure, but not all the embodiments. Based on the embodiments as described in the present disclosure, all the other embodiments obtained by those ordinary skilled in the art without paying any inventive labor shall fall into the scope sought for protection in the present disclosure.

Unless otherwise defined, technical terms or scientific terms used in the present disclosure shall have common meanings understood by those ordinary skilled in the art. "First", "second' and similar words used in the present disclosure do not indicate any sequence, quantity or importance, but are just used to distinguish different components. Also, "include" or "comprise" or similar words mean that an element or an object appearing prior to the word covers an element or an object or equivalents thereof appearing subsequent to this word, but does not exclude other elements or objects. "Connect" or "connected to" or similar words are not limited to physical or mechanical connection, but can comprise electrical connection or signal connection, regardless of direct or indirect connection.

In the embodiments of the present disclosure, at least one of the instruction pipeline operations, which includes fetch, decoding and execution, and prefetch operation is adapted for determining operation sequences of respective instructions based on criticality information of the respective instructions. Herein, the criticality information indicates importance degree of the instructions in the running process. For example, at least one of fetch sequence, decoding sequence, execution sequence of respective instructions in the instruction pipeline operation and prefetch sequence of respective instructions can be determined based on the criticality information of the instructions, so that the operation sequence of the instructions becomes more reasonable, and thus efficiency in running the program can be enhanced.

Embodiments of the present disclosure will be described below in detail by referring to the accompanying figures.

Figure 1:
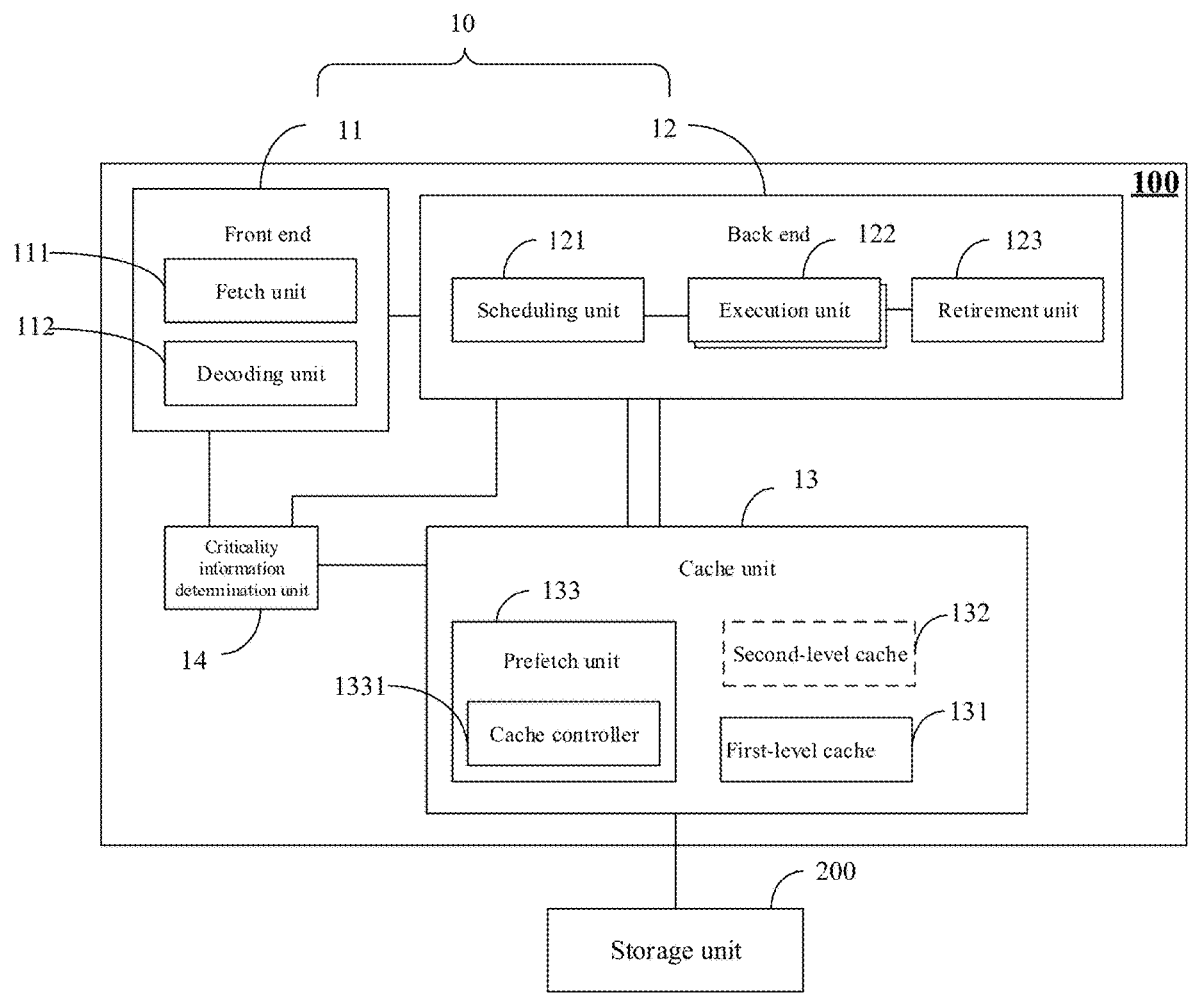
FIG. 1 is a schematic diagram of a structure of a processor according to some embodiments of the present disclosure.

FIG. 1 is a schematic diagram of a structure of a processor according to some embodiments of the present disclosure. The embodiments of the present disclosure will be described by referring to FIG. 1.

A processor 100 in the embodiments of the present disclosure can comprise a pipeline unit 10. The pipeline unit 10 is configured to perform a pipeline operation on the instructions used for realizing the functions of the program.

A program is an instruction combination arranged according to a certain sequence. Running the above mentioned instruction combination can realize specific functions of the program. The certain sequence can be called as a program sequence.

Those skilled in the art can understand that the above instructions may be instructions of various instruction sets, for example, the instructions may be instructions from an x86 instruction set, instructions from an MIPS instruction set, and instructions from an ARM instruction set, and so on. Furthermore, the instructions can be obtained by compiling a program written in a high-level language, or may be derived from a program written in an instruction set language.

In some examples, the pipeline unit 10 can perform the pipeline operation of the instructions according to the program sequence.

In some other embodiments, the pipeline unit 10 can execute the instruction combination of the program out of order, i.e., not executing the instruction according to the program sequence, so as to improve the operation efficiency of the instructions.

In the process of out of order execution, in order to ensure normal implementation of functions of the program, when resources needed for executing one piece of instruction are not ready, a need to insert bubbles is likely to occur. This piece of instruction can be made to wait until the resources are ready by inserting the bubbles.

In order to further improve the operation efficiency of the instructions, in the embodiments provided in the present disclosure, the processor 100 can be configured to obtain criticality information of an instruction, and determine an operation sequence of the instruction based on the criticality information. Herein, the criticality information of the instruction indicates importance degree of the instruction in the running process of the program.

For example, the importance degree of the instructions can be determined based on at least one of the following items.

Dependency degree of an instruction being depended by other instructions, i.e., a number of times of an execution result of one piece of instruction that needs to be utilized by other instructions. The more times of an execution result of one piece of instruction utilized by other instructions, the more important the piece of instruction is. Thus, the piece of instruction can be executed as soon as possible and its result would be applicable to other instructions.

Number of miss time of the instruction. If the number of miss time of one piece of instruction in the execution process is greater, it could be considered that the current importance degree of the instruction is underestimated, so that the importance degree of the instruction can be increased.

Storage location of an instruction when it is hit. If the instruction is stored in a lower-level storage unit when it is hit, more time is spent on reading the instruction, so that the importance degree of the instruction can be increased. In the present disclosure, the lower the level of a storage unit is, more time is needed to read the data stored in the storage unit. For example, the existing computing device can comprise storage units such as a first-level cache, a second-level cache, a third-level cache and a primary memory. The time spent by the processor on reading data from the above storage units may be incremented sequentially. In this case, it may be considered that the levels of the above storage units are descended sequentially. For example, the level of the second-level cache is lower than the first-level cache, the level of the third-level cache is lower than the second-level cache, and the level of the main memory is lower than the third-level cache;

Information about pipeline execution of the instruction. If a number of times of instruction pipeline stalls caused by one piece of instruction is greater or the stall time is longer, it could be considered that the current importance degree of the instruction is underestimated, so that the importance degree of the instruction can be increased.

Additionally, the importance degree of the instructions in the running process of the program can be determined comprehensively in combination with the overall operating efficiency of the program after the criticality information of the instructions is adjusted as well as other factors concerning the performance of the processor.

In some embodiments, the criticality information of the instructions can be obtained by utilizing the pipeline unit 10, and the pipeline operation is performed for the instructions based on the obtained criticality information.

For example, the pipeline unit 10 can comprise a front end 11 and a back end 12. The front end 11 can be used to perform operations of fetching and analyzing for the instructions to be executed. The back end 12 can be used to implement execution of the instructions according to the information determined by the front end 11. In the following text, the back end 12 can also be called as an execution engine.

The front end 11 can comprise a fetch unit 111 and a decoding unit 112. The fetch unit 111 can be configured to fetch the instructions back from the cache or the memory. The decoding unit 112 can be configured to decode the instructions fetched backed from the fetch unit 111, to determine operation codes and/or address codes and so on of the instructions.

Herein, the fetch unit 111 can perform fetch operations for the instructions based on a fetch sequence determined according to the criticality information. The decoding unit can perform decoding operations for the instructions based on a decode sequence determined according to the criticality information.

The back end 12 can comprise a scheduling unit 121, at least one execution unit 122 and a retirement unit 123. The execution unit 122 can be configured to perform instruction executions, the scheduling unit 121 can be configured to determine a scheduling process of the instructions to be executed by the execution unit 122, and the retirement unit 123 can be configured to remove an executed instruction from the scheduling process.

Herein, the execution unit 122 can execute the instructions according to the operation sequence determined according to the criticality information.

Control of the operation sequence of the instructions by the pipeline unit 10 can be realized in a variety of ways, and no limitation is made herein. For example, any one or more of the fetch unit 111, the decoding unit 112, and the execution unit 122 can be configured to be adapted for obtaining the criticality information and determining the operation sequence of the instructions according to the criticality information. For another example, the execution sequence of the instructions of the execution unit 122 can be determined by the scheduling unit 121 by referring to the criticality information. Alternatively, a control unit (not shown in the figure) can also be set for controlling the operation sequence of the instructions of the respective units in the pipeline unit 10 according to the criticality information.

As shown in FIG. 1, the processor 100 can further comprise a cache unit 13. The cache unit 13 can comprise a one-level cache or a plurality of level of caches, for example, the first-level cache 131 and the second-level cache 132 as shown in FIG. 1. It could be understood that the cache unit shown in FIG. 1 can also comprise a more levels of caches.

In some embodiments, the cache unit 13 can further comprise a prefetch unit 133. The pre-fetch unit 133 can prefetch the instructions to be executed by the pipeline unit 10 or the data needed to execute the instructions from a storage unit 200 to the first-level, the second-level or other levels of caches. Herein, for example, the time spent by the pipeline unit 10 on reading data from the storage unit 200, the second-level cache 132, and the first-level cache 131 can be descended sequentially. Herein, the prefetch unit 133 can perform prefetch operations for the instructions based on a prefetch sequence of the instructions determined according to the criticality information.

In some embodiments, the prefetch unit 133 can comprise a cache controller 1331. The cache controller 1331 can be configured to determine the prefetch sequence of the instructions based on the criticality information of the instructions. For example, prefetch priorities of different instructions can be determined by the cache controller 1331 based on the criticality information, so as to control the prefetch sequence and allocate more resources to more important instructions.

In some embodiments, the processor 100 can allocate various resources that support the instruction operations based on the criticality information. For example, resources can be allocated to respective queues in the processor according to the criticality information of the instructions, such as a data prefetch queue, various types of queues in the pipeline operation of the instructions and other queues. For another example, resources can be allocated to respective execution units in the processor according to the criticality information of the instructions. Those skilled in the art can understand that since the allocation of resources supports the operations of the instruction operations, determining the operation sequence of the instruction comprises determining allocation of the resources.

In some embodiments, the processor in the embodiments of the present disclosure can further comprise a criticality information determination unit 13, which is adapted to determine the criticality information of the instructions. For example, the criticality information determination unit 14 can obtain information from the back end 12, i.e., the execution engine, and can calculate and obtain the criticality information of the instructions based on the obtained information. In some examples, the pipeline unit 10 and the cache unit 13 can obtain the criticality information of the instructions from the criticality information determination unit 14, and determine the operation sequence of the instruction based on the criticality information of the instructions. For example, in the execution process of the instructions, respective units in the pipeline unit 10 and the cache unit 13 can obtain the criticality information of the instructions from the criticality information determination unit 14 in real time, and execute the instructions according to the operation sequence of the instructions determined based on the criticality information.

By determining the criticality information of the instructions and determining the operation sequence of the instructions in combination with the criticality information, the operation sequence of the instructions would become more reasonable, so that the running efficiency of the program is improved.

For example, determining the operation sequence of the instructions of the processor based on the criticality information of the instructions can make more important instructions to be executed preferably, so that the running process of the program becomes more unhindered and more efficient.

Additionally, by controlling the prefetch sequence of the prefetch unit according to the criticality information through the prefetch unit, occurrence of the situation of miss of the fetch data can be reduced when a more important instruction is executed, so that the waiting time during execution can be reduced, bubbles in the execution process can be decreased and the running efficiency of the program is improved.

Figure 2:
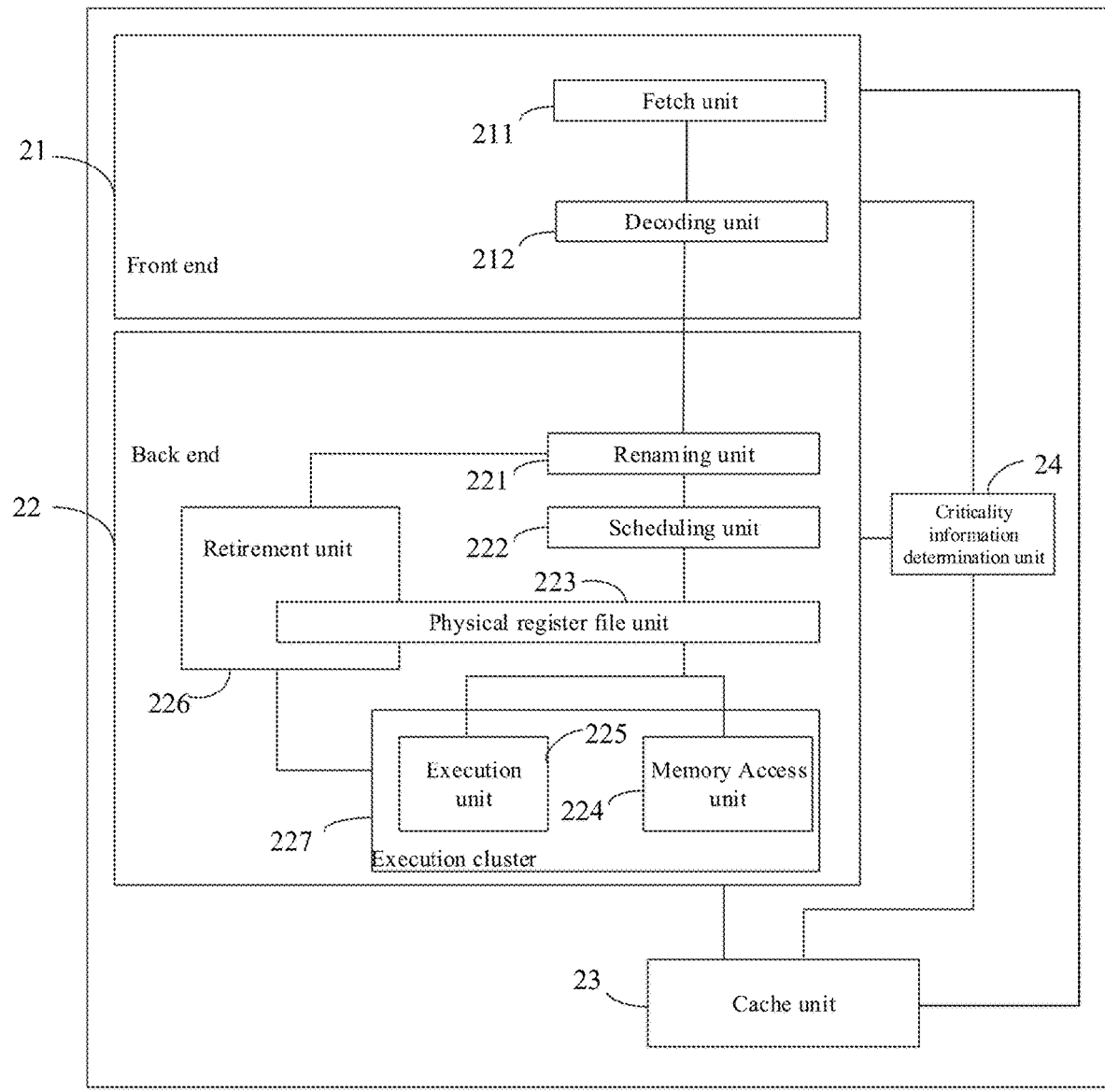
FIG. 2 is a schematic diagram of structure of another processor according to some embodiments of the present disclosure.

FIG. 2 is a schematic diagram of a structure of another processor in some embodiments of the present disclosure. The embodiments of the present disclosure will be further described below by referring to FIG. 2.

As shown in FIG. 2, the processor can comprise a front end 21 and a back end 22. The front end 21 is coupled to the back end 22. Both the front end 21 and the back end 22 are coupled to a cache unit 23.

In some embodiments, the cache unit 23 can comprise an instruction cache, which is used to store a recently accessed instruction. For example, the instruction cache can be located in a first-level cache L1. The solution of the present disclosure does not limit the specific location of the instruction cache. The instruction cache unit can be accessed via the front end 21. In some embodiments, the cache unit 23 further comprises a microinstruction cache. The microinstruction cache can be used to store the microinstruction obtained which is decoded and outputted the instructions by the decoding unit. In some example, the microinstruction cache unit and the instruction cache unit can be arranged separately.

In some embodiments, the criticality information can be obtained from the instruction cache, to determine the operation sequence of the instructions.

For example, the criticality information can be stored in a location associated with the instructions in the instruction cache. For example, the criticality information can be stored in a location adjacent to a corresponding instruction, so that the criticality information of the instructions can be read upon reading the instructions.

As shown in FIG. 2, the front end 21 can comprise a fetch unit 211 and a decoding unit 212. The fetch unit 211 and the decoding unit 212 in FIG. 2 can be implemented as the fetch unit 111 and the decoding unit 112 as shown in FIG. 1. Herein, the decoding unit 212 can decode an instruction fetched by the fetch unit 211, and can produce one or more microinstructions as the output, and thus no further details are given herein.

In some embodiments, the front end 21 can further comprise a branch prediction unit. The branch prediction unit can be used in a pipeline to realize branch prediction, and can predict the instruction to be fetched back next time. In some embodiments, the branch prediction unit can perform the branch prediction according to the criticality information of the instructions.

In some embodiments, the decode unit 212 can be coupled to the back end 22 where a renaming unit 221 is located. The renaming unit 221 is adapted to map a logic register of the instructions to a physical register. The logic register can be determined after the compiler compiles the program written in a high-level language. The physical register may be different in different processors. The renaming unit 221 can be coupled to a scheduling unit 222, and the number of the scheduling unit 222 may be one or more. In some embodiments, the speed of converting from a virtual address into a physical address can be improved by utilizing an instruction TLB unit, i.e., a translation lookaside buffer (TLB).

The scheduling unit 222 can be coupled to a physical register file unit 223, i.e., a physical register file, and can be an array of a plurality of registers in the processor. The number of the physical register file unit 223 can be one or more, and one or more types of data can be stored in the physical register file unit(s). A retirement unit 226 and the physical register file unit 223 can be coupled to an execution cluster 227, and the execution cluster 227 can comprise one or more groups of execution units 225 and a memory access unit 224. Herein, the execution unit 225 can perform one or more types of operations, and the target data of the operations executed by the execution unit may be one or more types of data. The execution cluster 227 can execute the instructions out of order, and the retirement unit 226 can write back an execution result to a register visible to the user according to the above program sequence.

By combining with the above basis of determination with reference to importance degree of the instructions, in some embodiments, the criticality information determination unit 24 can determine the criticality information of the instructions based on at least one of the dependency relationship information between the instructions, the pipeline execution information of the instructions, and the hit information during execution of the instructions.

For example, referring back to FIG. 2, the criticality information determination unit 24 can determine the dependency relationship information between the instructions based on the information obtained from the renaming unit 221. For example, when a renaming operation is performed, a counter can be set for a physical register. If the data in the physical register is depended by execution of other instructions, the number of times of being depended execution of other instructions is recorded, and the dependency relationship between the instructions is determined according to the number of times of being depended. The more an instruction is depended by other instructions, the more important the instruction is. That is, the instruction is more critical.

In some embodiments, the criticality information determination unit 24 can determine the pipeline execution information of the instructions based on the information obtained from the retirement unit 226. As described above, the information about the pipeline execution of the instructions can be a number of times or a time duration of the instruction pipeline stalls caused by the instructions. The retirement unit 226 can write back the execution result to the register visible to the user according to the above program sequence, and the instructions can end up in a writing back phase, so that the information about the pipeline execution of the instructions can be obtained from the retirement unit 226.

In some embodiments, the criticality information determination unit 24 can obtain the hit information of the instructions from the memory access unit 224, and can determine the criticality information in combination with the hit status of data needed for executing the instructions. In some examples, the hit information can comprise the number of times of hit or miss of the instructions. If the number of times of miss of one piece of instruction is relatively great when the instruction is executed in a preceding execution, the criticality information of the instruction can be adjusted, so that the instruction becomes more critical, so as to reduce the number of times of miss when the instruction is executed next time. In some other examples, the hit information can further comprise a storage location when the piece of instruction is hit. If the instruction is stored in a lower-level storage unit when the piece of instruction is hit, it means that the time spent on reading the piece of instruction is relatively long, so that the importance degree of the piece of instruction can be increased.

Those skilled in the art can understand that there could be a variety of ways for determining the criticality information. The criticality information can be determined in combination with at least one of the dependency relationship information between the instructions, the pipeline execution information of the instructions, and the hit information during execution of the instructions, or the criticality information is determined based on other information. For example, the criticality information can also be determined by referring to the information in the compiling process.

As described above, the criticality information may be information having been stored or generated in real time in the running process of the program.

In some embodiments, the program can be run for many times in the processor. In a preceding running process of the program, the criticality information of the instructions corresponding to the program can be generated for running the program next time. The operation sequence of the instructions is adjusted based on the criticality information, so that the running efficiency of the program is improved.

In some other embodiments, the operation sequence of the instruction can also be adjusted based on the criticality information generated in the process of running at this time. For example, the generated criticality information may direct any one of an operation sequence in the subsequent process of the pipeline operation of the instructions or a prefetch sequence of the instructions. For example, by referring to FIG. 2, the criticality information determination unit 24 can generate the criticality information based on the information obtained from the renaming unit 221 and the retirement unit 226, and the scheduling unit 222 can perform scheduling of the instructions based on the criticality information.

In some embodiments, the criticality information determination unit 24 can perform an updating operation for the criticality information. For example, the criticality information can be updated in combination with feedback information about the running status of the program. As described above, the program can be run in the processor for many times. The criticality information can be updated and adjusted in combination with the running efficiency of the operation sequence of the instructions determined based on the criticality information when the program is run again, so that the criticality information becomes more suitable for improving the running efficiency of the program.

Those skilled in the art can understand that FIGS. 1 and 2 are just for illustration, but are not limitations to internal structure and connection relationship of the processor. The processor in the embodiments of the present disclosure may be a processor corresponding to different instruction sets, and implementations of respective units inside the processor may also be diversified.

Figure 3:
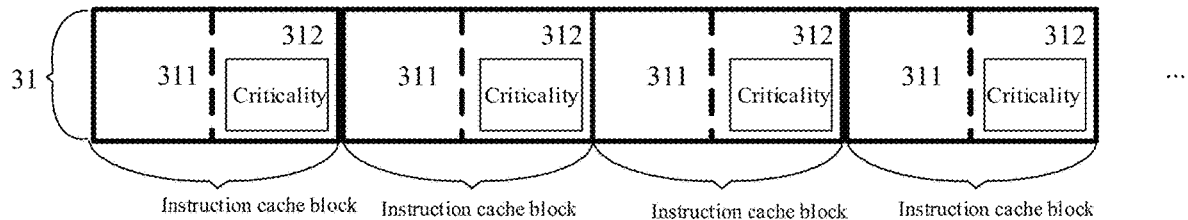
FIG. 3 is a schematic diagram of structure of an instruction cache according to some embodiments of the present disclosure.

FIG. 3 shows a schematic diagram of an instruction cache according to some embodiments of the present disclosure.

As shown in FIG. 3, an instruction cache unit 31 can comprise a plurality of instruction cache blocks, each of which can comprise instruction storage spaces 311 that store the instructions and criticality storage spaces 312 that store the criticality information.

In some embodiments, the criticality storage space 312 may be a storage space adjacent to the instruction storage space 311.

In some other embodiments, the storage space associated with the corresponding instruction may be a non-adjacent storage space. For example, the criticality storage space 312 can be any storage space that satisfies a preset mapping relationship with the instruction storage space 311.

Those skilled in the art can understand that the instruction cache can be located at the first-level cache or other levels of cache, or can be located inside or outside the core of the processor, to which no limitation is made.

In some embodiments, the above instructions can be microinstructions obtained by decoding instructions from the instruction set. In this case, the instruction cache unit 31 can further comprise a microinstruction cache for storing the microinstructions. Herein, the criticality information of the instructions can be stored at locations in the microinstruction cache that is associated with the microinstruction storage locations. For example, the criticality information can be stored in a storage location adjacent to the storage location of the microinstruction. For another example, the criticality information can also be stored in a storage space that satisfies the preset mapping relationship with the microinstruction storage location.

In other embodiments of the present disclosure, the criticality information can be stored in association with an instruction index. Therefore, the corresponding criticality information of the instructions can be obtained according to the instruction index and the association relationship between the instruction index and the criticality information.

The criticality information can be stored in the first-level cache or the second-level cache, or can be stored in an internal cache or external cache of the processor core, to which no limitation is made.

In the embodiment of the present disclosure, the processor can operate the instructions according to the instruction operation sequence determined based on the criticality information, for example, the prefetch operation, the fetch operation, the decode operation and/or the execution operation of the instructions, etc., so that the operation sequence of the instructions becomes more reasonable, and thus the running efficiency of the program can be improved.

Figure 4:
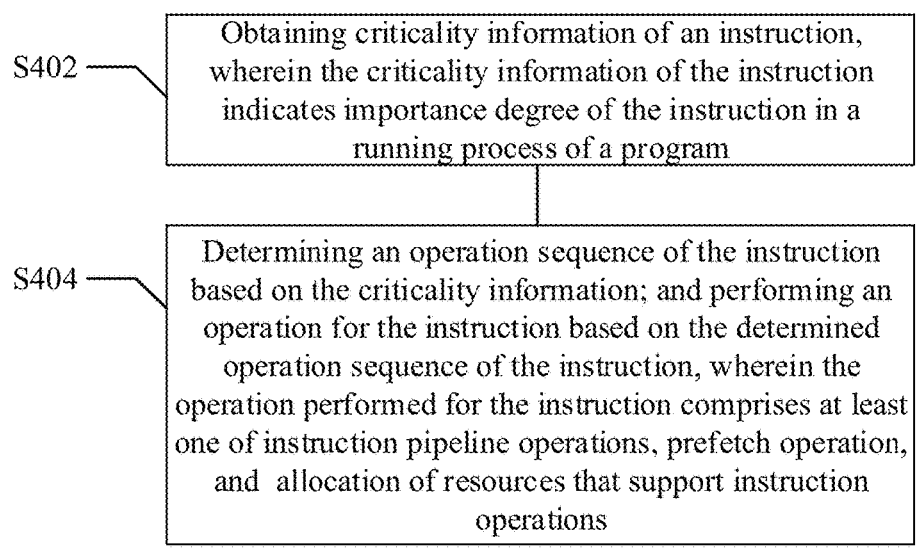
FIG. 4 is a flow chart of an instruction operation method according to some embodiments of the present disclosure.

FIG. 4 shows a flow chart of an instruction operating method according to some embodiments of the present disclosure. As shown in FIG. 4, in step S402, the criticality information of the instructions can be obtained. The criticality information of the instructions indicates the importance degree of the instructions in the running process of the program. The instruction operating method as shown in FIG. 4 can be performed by utilizing the processor as shown in FIGS. 1 and 2.

In some embodiments, the above mentioned instructions can be instructions from an instruction set. For example, the above mentioned instructions may be instructions from an x86 instruction set, instructions from an MIPS instruction set, instructions from an ARM instruction set, and so on. In some other embodiments, the above instructions may also be microinstructions obtained by decoding the instructions from the instruction set.

In some embodiments, the criticality information of the instructions indicates the importance degree of the instructions in the running process of the program. For example, the importance degree of the instructions can be determined based on at least one of the following items:

Dependency degree of one piece of instruction being depended by other instructions, i.e., a number of times of an execution result of the piece of instruction that needs to be utilized by other instructions. If the number of times of the execution result of the piece of instruction utilized by other instructions is greater, the importance degree of the piece of instruction can be increased, so that the piece of instruction can be executed as soon as possible and the execution result would be applicable to other instructions.

Number of times of miss of an instruction. If the number of times of miss in the execution process of one piece of instruction is relatively great, it can be considered that the current importance degree of the instruction is underestimated, so that the importance degree of the instruction can be increased.

Storage location when the instruction is hit. If the instruction is stored in a lower-level storage unit when the instruction is hit, it means that more time is spent on reading the instruction, so that the importance degree of the instruction can be increased.

The more the number of times or the longer the time duration of the instruction pipeline stalls caused by one piece of instruction is, the higher the importance degree of the instruction is.

In addition, the importance degree of the instructions in the running process of the program can be determined in combination with the overall operation efficiency of the program after the criticality information of the instruction is adjusted as well as other factors concerning the performance of the processor.

For example, the dependency relationship information between the instructions can be determined based on the renaming operation of the instructions. A counter can be set for the physical register. When the renaming operation is performed, if the data in the physical register is depended by execution of other instructions, the amount of dependencies by execution of other instructions is recorded, and the dependency relationship between the instructions can be determined according to the amount. A piece of instruction depended more by other instructions becomes more important, that is, the piece of instruction become more critical.

The execution information of the pipeline of the instructions can be determined based on the retirement operation of the instructions. As described above, the execution information of the pipeline of the instructions can be a number of times or a time duration of instruction pipeline stalls caused by the instruction. The retirement operation can write back the execution result to the register visible to the user according to the above program sequence, and the instructions can end up in a writing back phase, so that the execution information of the pipeline of the instructions can be obtained according to the retirement operation.

The criticality information can be determined based on the hit situation of the data needed for executing the instruction. For example, the number of times of miss of one piece of instruction is relatively great in a preceding execution, the criticality information of the piece of instruction can be adjusted, so that the piece of instruction becomes more critical, so as to reduce the number of times of miss when the piece of instruction is executed next time. For another example, if one piece of instruction is stored in a lower-level storage unit when being hit, it means that more time is spent on reading the piece of instruction. Therefore, the criticality information of the piece of instruction can be adjusted to be more critical, thereby increasing the efficiency in executing the instruction.

In some embodiments, the criticality information of the instruction may have been stored.

For example, obtaining the criticality information of the instructions can refer to obtaining the criticality information of the instructions from the instruction cache. The criticality information can be stored at a location in the instruction cache associated with the corresponding instruction, for example, it can be stored at a location adjacent to the corresponding instruction, so that the criticality information of the instruction can be read upon reading the instruction. For another example, the criticality information can be stored in another storage space that satisfies a predetermined mapping relationship with the storage space of the corresponding instruction. Therefore, the storage space of the criticality information can be determined according to the storage space of the corresponding instruction, so as to obtain the criticality information.

For another example, obtaining the criticality information of the instructions can refer to obtaining the criticality information according to instruction index and an association relationship between the instruction index and the criticality information.

In some other embodiments, the criticality information of the instructions can also be generated in real time in the running process of the program.

For example, the program can be run for many times in the processor. In the running process of the program in a preceding time, the criticality information of the instructions of the corresponding program can be generated for running the program next time. The operation sequence of the instructions is adjusted based on the criticality information, to improve the running efficiency of the program.

For another example, the operation sequence of the instructions can be adjusted based on the criticality information generated in the running process at this time.

In some other embodiments, the updating operation can be performed for the criticality information of the instructions. For example, the criticality information can be updated in combination with the feedback information about the running status of the program. As described above, the program can be run by the processor for many times. When the program is run again, the running efficiency of the operation sequence of the instructions is determined based on the criticality information, and the criticality information can be updated and adjusted, so that the criticality information can be made to become more suitable for improving the running efficiency of the program.

In step S404, the operation sequence of the instructions can be determined based on the criticality information, and operation is performed for the instructions based on the determined instruction operation sequence.

In some embodiments, operations performed by the processor for the instructions can comprise a prefetch operation, a fetch operation, a decoding operation and an execution operation. The operation sequence of the instructions may be a prefetch sequence, a fetch sequence, a decoding sequence and/or an execution sequence of the instructions.

In some other embodiments, the operations performed by the processor for the instructions can comprise allocation of resources that support instruction operations. For example, resources can be allocated to respective queues in the processor according to the criticality information of the instructions, such as a data prefetch queue, various types of queues in the pipeline operation of the instructions and other queues. For another example, resources can be allocated to respective execution units in the processor according to the criticality information of the instructions.

The instruction operation method in the embodiments of the present disclosure can be implemented by the processor in the embodiment of the present disclosure. Noun explanations, implementation principles and beneficial effects concerning the instruction operation method in the embodiments of the present disclosure can refer to the processor in the embodiments of the present disclosure, and thus no further details are given herein.

Figure 5:
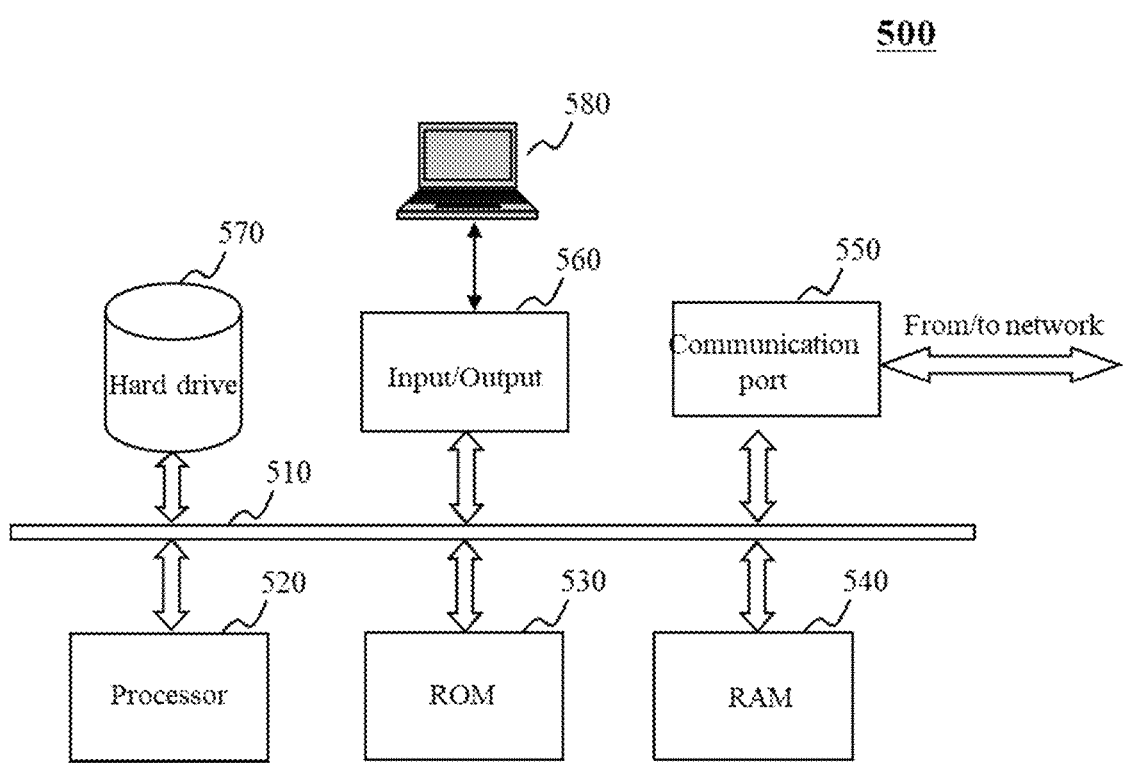
FIG. 5 shows an architecture of a computing device according to some embodiments of the present disclosure.

FIG. 5 shows an architecture of a computing device according to some embodiments of the present disclosure.

As shown in FIG. 5, the computing device 500 can comprise a bus wire 510, one or more processors 520, a read only memory (ROM) 530, a random-access memory (RAM) 540, a communication port 550 connected to the network, an input/output component 560, a hard drive 570, etc. The processor 520 can be implemented as the processor as shown in FIG. 1 or FIG. 2 of the present disclosure. The storage device in the computing device 500, for example the ROM 530 or the hard drive 570, can store various data or files used by the instruction operation method provided in the present disclosure and program instructions executed by the processor. The computing device 500 can further comprise a user interface 580. Of course, the architecture as shown in FIG. 5 is just for illustration. When different devices are implemented, according to the actual requirement, one or more components in the computing device as shown in FIG. 6 can be omitted.

The embodiment of the present disclosure can be implemented as a computer readable storage medium. A computer readable instruction is stored on the computer readable storage medium according to the embodiment of the present disclosure. When the computer readable instruction is ran by the processor, the method according to the embodiment of the present disclosure described by referring to the above accompanying figures can be implemented. The computer readable storage medium comprises but does not limit to for example a volatile memory and/or a non-volatile memory. The volatile memory can comprise for example a random access memory (RAM) and/or a cache memory, etc. The non-volatile memory can comprise for example a read only memory (ROM), a hardware, a flash memory, etc.

Those skilled in the art can understand that the content disclosed in the present disclosure may have various modifications and improvements. For example, the various devices or components described above can be implemented through a hardware, or can also be implemented through a software, a firmware, or combination of some or all of the hardware, the software, and the firmware.

In addition, as disclosed in the present disclosure and the Claims, unless otherwise explicitly indicated, "a/an", "one", "one kind" and/or "the" do not specially refer to a singular number, but all comprise a complex number. Generally speaking, terms of "include" and "comprise" only indicate comprising steps and elements having identified, while these steps and elements do not form an exclusive list, and the method or the device is also likely to comprise other steps or elements.

In addition, although the present disclosure makes various references to certain units in the system according to the embodiment of the present disclosure, any number of different units can be used and applied at a client and/or a server. The unit is just for illustration, and different aspects of the system and method can use different units.

In addition, flow diagrams are used in the present disclosure to describe operation performed by the system according to the embodiments of the present disclosure. It shall be understood that previous or subsequent operations are not necessarily to be performed accurately in sequence. On the contrary, various steps can be processed in an inverted sequence or processed simultaneously. At the same time, other operations can also be added to these processes, or one step of operation or several steps of operations can be removed from these processes.

Unless otherwise defined, all the terms (including technical and scientific terms) used herein have same meaning commonly understood by those ordinary skilled in the art. It shall be understood that those terms defined in common dictionaries shall be explained as having meanings consistent with their meanings in the context of relative technology, but shall not be explained as idealized meanings or very formal meanings, unless otherwise explicitly defined herein.

The above are descriptions of the present disclosure, but shall not be deemed as limitations to the present disclosure. Although several exemplary embodiments of the present disclosure are described, it is easy for those skilled in the art to understand that many modifications and amendments can be made to exemplary embodiments without departing from novel teachings and advantages of the present disclosure. Therefore, all these amendments intend to be included within the scope of the present disclosure defined in the Claims. It shall be understood that the above are descriptions of the present disclosure but shall not be deemed as being limited to specific embodiments of the present disclosure. Furthermore, amendments made to the disclosed embodiments and other embodiments intend to be included within the scope of the attached Claims. The present disclosure is defined by the Claims and equivalents thereof.

The invention claimed is:

1. An instruction operation method comprising:
    upon reading an instruction stored in an instruction storage space, obtaining, from a criticality storage space, criticality information of the instruction, wherein the criticality information of an instruction indicates an importance degree of the instruction in a running process of a program, wherein an instruction cache unit located at a second-level cache comprises a plurality of instruction cache blocks, each of which can comprise instruction storage spaces and criticality storage spaces, the criticality storage space is a storage space adjacent to the instruction storage space;
    determining a prefetch sequence of the instruction based on the criticality information, and prefetching the instruction to a first level cache;
    determining an operation sequence of the instruction in the cache based on the criticality information; and
    performing an operation for the instruction at the first level cache based on the determined operation sequence of the instruction, wherein the operation performed for the instruction comprises at least one of a fetch operation, a decoding operation, and an execution operation.

2. The instruction operation method according to claim 1, wherein the operation performed for the instruction comprises allocation of resources that support instruction operations.

3. The instruction operation method according to claim 1, wherein the instruction is an instruction from an instruction set and the criticality information is obtained from an instruction cache.

4. The instruction operation method according to claim 1, wherein the instruction is a micro-instruction, and the criticality information is obtained from a microinstruction cache.

5. The instruction operation method according to claim 4, wherein obtaining the criticality information of the instruction comprises determining a storage location of the criticality information according to a storage location of the instruction, to obtain the criticality information.

6. The instruction operation method according to claim 1, wherein the criticality information is determined according to at least one of dependency relationship information between the instruction and other instructions, pipeline execution information of the instruction, and hit information during execution of the instruction.

7. The instruction operation method according to claim 6, wherein the program is adapted for being run on a same processor for many times, and determining the criticality information comprises updating the criticality information according to information about a preceding run of the program.

8. A processor configured to execute the instruction operation method according to claim 1.

9. The processor according to claim 8, wherein the processor comprises:
   a fetch unit, configured to perform a fetch operation for the instruction;
   a decode unit, configured to perform a decoding operation for the instruction;
   an execution unit, configured to execute the instruction; and
   a prefetch unit, configured to perform a prefetch operation for the instruction.

10. The processor according to claim 9, wherein the operation performed for the instruction comprises allocation of resources that support instruction operations.

11. The processor according to claim 8, wherein the instruction is an instruction from an instruction set.

12. The processor according to claim 8, wherein the processor further comprises an instruction cache configured to store the criticality information of the instruction.

13. The processor according to claim 12, wherein the criticality information is obtained by determining a storage location of the criticality information according to a storage location of the instruction, to obtain the criticality information.

14. The processor according to claim 8, wherein the instruction is a microinstruction obtained by decoding the instruction from the instruction set.

15. The processor according to claim 8, wherein the criticality information is obtained by obtaining corresponding criticality information of the instruction according to an instruction index and an association relationship between the instruction index and the criticality information.

16. The processor according to claim 8, wherein the processor further comprises a criticality information determination unit, configured to determine the criticality information based on at least one of following information: dependency relationship information between the instruction and other instructions, pipeline execution information of the instruction, and hit information during execution of the instruction.

17. The processor according to claim 8, wherein the program is adapted for being run on the processor for many times, and the processor further comprises a criticality information determination unit, which is adapted for updating the criticality information according to information about a preceding run of the program.

18. An electronic device, comprising the processor according to claim 8 and a processor readable storage medium having stored thereon instructions used for realizing functions of a program, and the program function is realized by execution of the instructions by the processor.

* * * * *